(12) United States Patent
Saeki

(10) Patent No.: US 8,708,402 B2
(45) Date of Patent: Apr. 29, 2014

(54) BATTERY PROTECTION STRUCTURE FOR AUTOMOBILE

(75) Inventor: Koji Saeki, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/552,855

(22) Filed: Jul. 19, 2012

(65) Prior Publication Data

US 2013/0026786 A1 Jan. 31, 2013

(30) Foreign Application Priority Data

Jul. 26, 2011 (JP) .................................. 2011-163511

(51) Int. Cl.
*B62D 21/02* (2006.01)
*B62D 21/15* (2006.01)

(52) U.S. Cl.
CPC .................................. *B62D 21/157* (2013.01)
USPC ............ 296/187.12; 296/187.08; 296/193.07; 296/209; 180/68.5

(58) Field of Classification Search
USPC ............... 296/184.1, 187.08, 187.12, 193.02, 296/193.05, 193.07, 203.03, 204, 209; 180/60, 65.21, 68.5
See application file for complete search history.

(56) References Cited

U.S. PATENT DOCUMENTS

| | | | | |
|---|---|---|---|---|
| 5,501,289 A * | 3/1996 | Nishikawa et al. | ......... | 180/68.5 |
| 5,555,950 A * | 9/1996 | Harada et al. | ............ | 180/65.1 |
| 6,299,239 B1 * | 10/2001 | Sagawa et al. | .......... | 296/187.12 |
| 6,905,165 B2 * | 6/2005 | Kawabe et al. | .......... | 296/193.07 |
| 7,086,492 B2 * | 8/2006 | Kawasaki et al. | ............ | 180/274 |
| 7,500,714 B2 * | 3/2009 | Abe et al. | .................. | 296/193.07 |
| 7,527,326 B2 * | 5/2009 | Egawa et al. | ............ | 296/193.07 |
| 7,540,343 B2 * | 6/2009 | Nakashima et al. | ......... | 180/65.1 |
| 8,128,154 B2 * | 3/2012 | Egawa et al. | ............ | 296/187.12 |
| 8,439,428 B2 * | 5/2013 | Imamura | .................. | 296/193.05 |

FOREIGN PATENT DOCUMENTS

| | | | |
|---|---|---|---|
| EP | 554889 | A1 * | 8/1993 |
| JP | 3-88987 | U | 9/1991 |
| JP | 7-156831 | | 6/1995 |
| JP | 10316046 | A * | 12/1998 |
| JP | 2004-17808 | | 1/2004 |
| JP | 2007-283999 | A | 11/2007 |
| WO | WO 2010-137149 | A1 | 12/2010 |

OTHER PUBLICATIONS

Office Action issued Jun. 11, 2013 in Japanese Patent Application No. 2011-163511 submitting partial English translation only.

* cited by examiner

*Primary Examiner* — Glenn Dayoan
*Assistant Examiner* — Jason S Daniels
(74) *Attorney, Agent, or Firm* — Oblon, Spivak, McClelland, Maier & Neustadt, L.L.P.

(57) ABSTRACT

A battery protection structure for an automobile includes a rocker placed in a side portion of a body, a floor panel whose outer end in a body width direction is secured to the rocker, a reinforcement located more inward in the body width direction than the rocker, and secured to the floor panel, the reinforcement forming a part of a frame of the body, a battery located more inward in the body width direction than the rocker, and placed below the floor panel in the body, and an input member that connects between the rocker and the reinforcement, and configured to input, upon input of a collision load directed inward in the body width direction to the rocker, a part of the collision load to a midsection of the floor panel between the rocker and the reinforcement as a component directed upward of the body.

18 Claims, 4 Drawing Sheets

COMPARATIVE EXAMPLE

BATTERY PROTECTION STRUCTURE FOR AUTOMOBILE

INCORPORATION BY REFERENCE

The disclosure of Japanese Patent Application No. 2011-163511 filed on Jul. 26, 2011 including the specification, drawings and abstract is incorporated herein by reference in its entirety.

BACKGROUND OF THE INVENTION

1. Field of the Invention

The invention relates to a battery protection structure for protecting a battery placed below the floor panel in the body of an automobile, from deformation of the body's side portion in a lateral collision.

2. Description of Related Art

In the floor structure for an electric automobile disclosed in Japanese Patent Application Publication No. 7-156831 (JP 7-156831 A), a side member is mounted on the lower surface of the side portion of a floor panel. A battery frame installed with a battery is mounted on the side member. An outrigger is mounted between a side sill (rocker) provided at the side edge of the floor panel and the side member. The outrigger is provided with an extended portion that is adjacent to the outside wall of the battery frame.

The floor structure mentioned above uses the outrigger to keep the outside wall of the battery frame from collapsing in a lateral collision, thereby preventing damage to the battery. Also, the floor structure absorbs impact energy by causing the body's side portion such as the side sill and the outrigger to undergo crushing deformation.

With the floor structure mentioned above, in cases such as when a high capacity, large sized battery is required or when the width dimension of the vehicle is small, it is difficult to keep the amount of deformation (deformation stroke) of the body's side portion in a lateral collision to an extent that can avoid interference between the body's side portion and the battery. In such cases, interference between the body's side portion and the battery can be easily avoided by reducing the amount of deformation of the body's side portion by increasing the strength and rigidity of the body's side portion. However, such a configuration leads to an increase in the mass and cost of the body.

SUMMARY OF THE INVENTION

The present invention provides a battery protection structure for an automobile that can protect a battery in a favorable manner from deformation of the body's side portion in a lateral collision, and can keep the mass and cost of the body from increasing.

A battery protection structure for an automobile according to a first embodiment of the invention includes a rocker that is placed in a side portion of a body of the automobile, a floor panel whose outer end in a body width direction is secured to the rocker, a reinforcement that is located more inward in the body width direction than the rocker, and is secured to the floor panel, the reinforcement forming a part of a frame of the body, a battery that is located more inward in the body width direction than the rocker, and is placed below the floor panel in the body, and an input member that connects between the rocker and the reinforcement, and is configured to input, upon input of a collision load directed inward in the body width direction to the rocker, a part of the collision load to a midsection of the floor panel between the rocker and the reinforcement as a component directed upward of the body.

In the above-mentioned configuration, the input member connects between the rocker that is placed in the side portion of the body, and the reinforcement that is placed more inward in the body width direction than the rocker. When a collision load directed inward in the body width direction is inputted to the rocker in a lateral collision, the input member inputs a part of the collision load to the midsection of the floor panel between the rocker and the reinforcement as a component directed upward of the body. The floor panel thus deforms toward the upper side of the body. As a result, the impact energy is dispersed, thereby reducing the amount of deformation (deformation stroke) of the body's side portion toward the inner side in the body width direction. Consequently, the battery that is placed more inward in the body width direction than the rocker and below the floor panel in the body can be protected from deformation of the body's side portion in a favorable manner. Moreover, the input member may simply be any member that guides deformation of the floor panel toward the upper side of the body. Thus, the input member can be constructed with light weight and at low cost. Therefore, it is possible to keep the mass and cost of the body from increasing.

A battery protection structure according to a second embodiment of the invention includes: a rocker that is placed in a side portion of a body of the automobile, a floor panel whose outer end in a body width direction is secured to the rocker, a reinforcement that is located more inward in the body width direction than the rocker, and is secured to the floor panel, the reinforcement forming a part of a frame of the body, a battery that is located more inward in the body width direction than the rocker, and is placed below the floor panel in the body, and an input member that connects between the rocker and the reinforcement, and is joined to the floor panel, the input member being flexed in its midsection in the body width direction so as to rise toward an upper side of the body by a collision load inputted to the rocker and directed inward in the body width direction.

In the above-mentioned configuration, the input member connects between the rocker that is placed in the side portion of the body, and the reinforcement that is placed more inward in the body width direction than the rocker. This input member is joined to the floor panel. When a collision load directed inward in the body width direction is inputted to the rocker in a lateral collision, the input member flexes in its midsection in the body width direction so as to rise (elevate) toward the upper side of the body. The floor panel thus deforms toward the upper side of the body. As a result, the impact energy is dispersed, thereby reducing the amount of deformation (deformation stroke) of the body's side portion toward the inner side in the body width direction. Consequently, the battery that is placed more inward in the body width direction than the rocker and below the floor panel in the body can be protected from deformation of the body's side portion in a favorable manner. Moreover, the input member may simply be any member that guides deformation of the floor panel toward the upper side of the body. Thus, the input member can be constructed with light weight and at low cost. Therefore, it is possible to keep the mass and cost of the body from increasing.

In the above-mentioned battery protection structure, the input member may be placed at a position that overlaps a frame of a vehicle seat mounted on an upper surface side of the floor panel in plan view.

In the above-mentioned configuration, the input member and the frame of the vehicle seat overlap each other in plan view. Thus, when the floor panel is deformed toward the upper side of the body by the input member, the floor panel can be brought into contact with the frame of the vehicle seat. Therefore, the amount of impact energy absorption can be increased, thereby reducing the amount of deformation of the body's side portion toward the inner side in the body width direction.

In the above-mentioned battery protection structure, the input member may include an outside reinforcing member that has a slope portion, the slope portion connecting between the rocker and the floor panel in a sloping manner so as to elevate as the slope portion extends inward in the body width direction, and an inside reinforcing member that is placed more inward in the body width direction than the outside reinforcing member, and connects between an inner end in the body width direction of the slope portion and the reinforcement, and a fragile portion may be provided between the outside reinforcing member and the inside reinforcing member.

In the above-mentioned configuration, when a collision load directed inward in the body width direction is inputted to the rocker in a lateral collision, a part of the collision load is transmitted to the inner end in the body width direction of the inside reinforcing member via the slope portion of the outside reinforcing member. The slope portion slopes so as to elevate as the slope portion extends inward in the body width direction. Therefore, the load transmitted to the inside reinforcing member via the slope portion includes a component that is directed inward in the body width direction, and a component that is directed upward of the body. The component directed inward in the body width direction is supported by the compressive strength of the inside reinforcing member. Thus, a rotation moment is exerted on the inside reinforcing member by the component directed upward of the body, with the reinforcement side end of the inside reinforcing member as a fulcrum. Thus, as the inside reinforcing member rotates toward the upper side of the body owing to the rotation moment, the input member flexes toward the upper side of the body at the fragile portion that is provided between the inside reinforcing member and the outside reinforcing member. Therefore, the area of the floor panel facing the fragile portion flexes toward the upper side of the body together with the input member, causing the floor panel to deform toward the upper side of the body with this flexing portion being situated at the top. Since the input member is divided into the outside reinforcing member and the inside reinforcing member, the strength, rigidity, and the like of the two reinforcing members can be set individually. Consequently, the deformation mode of the input member can be easily set.

In the above-mentioned battery protection structure, the outside reinforcing member may define a closed section together with the rocker and the floor panel, and the inside reinforcing member may define a closed section together with the floor panel.

In the above-mentioned configuration, the outside reinforcing member and the inside reinforcing member that are secured to the floor panel define a closed section as mentioned above. Therefore, it is possible to make the input member lightweight while securing the strength and rigidity required for the outside reinforcing member and the inside reinforcing member.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

A battery protection structure for an automobile according to an embodiment of the invention is described below with reference to FIGS. 1 to 4. In FIGS. 1 to 4, the arrow UP indicates the upper side of the vehicle, and the arrow IN indicates the inner side in the vehicle width direction.

Figure 1:
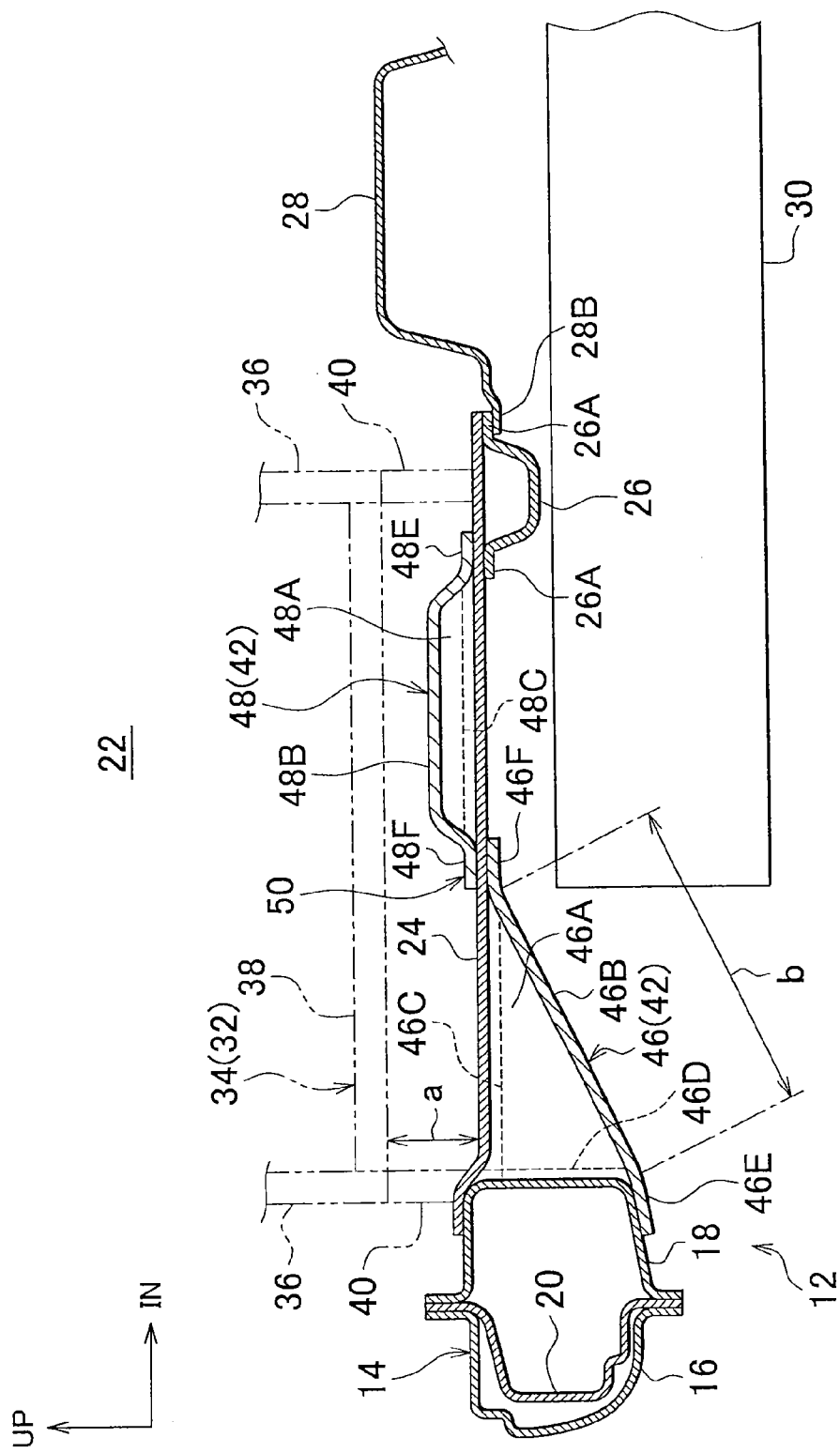
FIG. 1 is a vertical sectional view of a battery protection structure for an automobile according to an embodiment of the invention as viewed from the body's front side.

FIG. 1 is a vertical sectional view of a battery protection structure 10 for an automobile according to this embodiment as viewed from the body's front side. This automobile is, for example, an automobile installed with a battery 30 such as an electric automobile, a gasoline hybrid vehicle, or a fuel cell hybrid vehicle. The battery protection structure 10 for an automobile according to this embodiment is applied to such an automobile.

As illustrated in FIG. 1, a rocker 14 is arranged in a body's side portion 12 of the automobile. The rocker 14 is a body frame member with a closed sectional structure that extends along the front-to-rear direction of the body. The rocker 14 includes an outer panel 16, an inner panel 18, and a reinforcement 20. The inner panel 18 is placed inside the outer panel 16 in the body width direction. The reinforcement 20 is placed between the outer panel 16 and the inner panel 18.

A floor panel 24 that forms the floor portion of a cabin 22 is placed more inward in the body width direction than the rocker 14. The outer end in the body width direction of the floor panel 24 is coupled (secured) by spot welding or the like to the inner end in the body width direction of the upper surface of the inner panel 18.

An under-reinforcement 26 is provided more inward in the body width direction than the rocker 14 and below the floor panel 24. The under-reinforcement 26 is placed toward the middle in the body width direction of the automobile in such a way that its longitudinal direction lies along the front-to-rear direction of the body. The sectional shape of the under-reinforcement 26 as viewed from the front/rear of the body is an inverted hat shape. An upper end flange 26A of the under-reinforcement 26 is coupled (secured) to the lower surface of the floor panel 24 by spot welding or the like. The under-reinforcement 26 and the rocker 14 are connected to each other in the body width direction by a plurality of cross members including a cross member 42 described later. The under-reinforcement 26 and the rocker 14 form a part of the frame of the body together with these cross members.

A floor tunnel 28 is provided more inward in the body width direction than the under-reinforcement 26. The floor tunnel 28 forms the floor portion of the cabin 22 together with the floor panel 24. The sectional shape of the floor tunnel 28 as viewed from the front/rear of the body is a hat shape that opens downward of the body. A lower end flange 28B is coupled to the lower surface of one of the upper end flanges 26A of the under-reinforcement 26 that is located inward in the body width direction. Since the battery protection structure 10 for an automobile according to this embodiment is formed to be bilaterally symmetric with respect to the floor panel 28, the left side of the body is not illustrated in FIGS. 1 to 3.

A battery 30 is arranged more inward in the body width direction than the rocker 14 and below the floor panel 24 in the body. The battery 30 is formed in a rectangular parallelepiped shape with a small height dimension. The battery 30 is placed toward the middle in the body width direction with its longitudinal direction lying along the front-to-rear direction of the body. The battery 30 is stored inside an exterior member (not illustrated) secured (supported) on the frame (e.g., the rocker 14) of the body via a battery frame (not illustrated).

A vehicle seat (front seat in this case) 32 is arranged above the floor panel 24 in the body and in a front portion (front row) inside the cabin 22. The vehicle seat 32 includes a seat cushion frame 34 that is a frame member for a seat cushion. The seat cushion frame 34 includes a pair of left and right side frames 36, a rear frame 38, and a front frame (not illustrated). The pair of left and right side frames 36 face each other in the body width direction. The rear frame 38 connects the rear ends of the left and right side frames 36 to each other in the body width direction. The front frame connects the front ends of the left and right side frames 36 to each other in the body width direction. The left and right side frames 36 are connected to the floor panel 24 via a pair of left and right seat legs 40.

The cross member 42 as an input member is placed below the vehicle seat 32 in the body. The cross member 42 is placed at a position that overlaps the rear frame 38 (below the rear frame 38 in the body) in plan view. The cross member 42 includes an outside reinforcing member 46, and an inside reinforcing member 48. The inside reinforcing member 48 is placed more inward in the body width direction than the outside reinforcing member 46. In this embodiment, the outside reinforcing member 46 and the inside reinforcing member 48 are both formed of a sheet metal material that is thicker than the floor panel 24.

The outside reinforcing member 46 is placed on the lower surface side of the floor panel 24 and adjacent to the rocker 14, with its longitudinal direction lying along the body width direction. The sectional shape of the outside reinforcing member 46 as viewed along the direction of the body width is an inverted hat shape. The outside reinforcing member 46 includes a pair of front and rear side walls 46A, and a lower wall 46B (slope portion). The lower wall 46B connects the lower ends of the side walls 46A in the front-to-rear direction of the body. The side wall 46A located toward the front of the body is not illustrated in FIGS. 1 to 3.

The front and rear side walls 46A are formed in a triangular shape as viewed from the front/rear of the body. A flange 46C provided at the upper end of the front and rear side walls 46A is coupled to the lower surface of the floor panel 24 by spot welding or the like. Also, a flange 46D is provided at the outer end in the body width direction of the front and rear side walls 46A. The flange 46D is coupled to the inner end face in the body width direction of the inner panel 18 by spot welding or the like.

The lower wall 46B is placed in a sloping manner so as to elevate as the lower wall 46B extends inward in the body width direction. The length dimension "b" of the lower wall 46B is set longer than the distance "a" between the rear frame 38 of the vehicle seat 32 and the floor panel 24 (b>a).

A flange 46E is provided at the outer end in the body width direction of the lower wall 46B. The flange 46E projects outward in the body width direction. The flange 46E is coupled by spot welding or the like to the inner end in the body width direction of the lower surface of the inner panel 18. A flange 46F is provided at the inner end in the body width direction of the lower wall 46B. The flange 46F projects inward in the body width direction. The flange 46F is coupled by spot welding or the like to the vicinity of the midsection of the lower surface of the floor panel 24 between the rocker 14 and the under-reinforcement 26. Thus, the lower wall 46B connects obliquely between the rocker 14 and the floor panel 24, and the outside reinforcing member 46 defines a closed section together with the rocker 14 and the floor panel 24.

The inside reinforcing member 48 is placed between the outside reinforcing member 46 and the under-reinforcement 26 with its longitudinal direction lying along the body width direction. The sectional shape of the inside reinforcing member 48 as viewed along the direction of the body width is a hat shape. The inside reinforcing member 48 includes a pair of front and rear side walls 48A, and an upper wall 48B. The upper wall 48B connects the upper ends of the side walls 48A in the front-to-rear direction of the body. The side wall 48A located toward the front of the body is not illustrated in FIGS. 1 to 3.

The front and rear side walls 48A are formed in a trapezoidal shape with a small height dimension as viewed from the front/rear of the body. A flange 48C provided at the lower end of the front and rear side walls 48A is coupled to the upper surface of the floor panel 24 by spot welding or the like.

The upper wall 48B is placed so that its midsection in the body width direction lies parallel to the floor panel 24. The upper wall 48B slopes closer to the floor panel 24 at both ends in the body width direction. A flange 48E is provided at the inner end in the body width direction of the upper wall 48B. The flange 48E projects inward in the body width direction. The flange 48E is placed above one of the upper end flanges 26A of the under-reinforcement 26 that is located outward in the body width direction, in the body. The flange 48E is coupled to the above-mentioned upper end flange 26A and the floor panel 24 by spot welding or the like, with the floor panel 24 being sandwiched between the flange 48E and the upper end flange 26A. In other words, the flange 48E, the floor panel 24, and the upper end flange 26A are coupled to each other in a three-ply construction.

A flange 48F is provided at the outer end in the body width direction of the upper wall 48B. The flange 48F projects outward in the body width direction. The flange 48F is placed above the flange 46F of the outside reinforcing member 46 in the body. The flange 48F is coupled to the flange 46F and the floor panel 24 by spot welding or the like, with the floor panel 24 being sandwiched between the flange 48F and the flange 46F. In this coupling portion as well, the flange 48F, the floor panel 24, and the flange 46F are coupled to each other in a three-ply construction. In this way, the inside reinforcing member 48 defines a closed section together with the floor panel 24. Also, the coupling portion among the flange 48F, the floor panel 24, and the flange 46F is formed as a fragile portion 50 that is more fragile than the area where the outside reinforcing member 46 and the inside reinforcing member 48 define a closed section together with the floor panel 24. The fragile portion 50 is placed above an end in the body width direction of the battery 30 in the body.

Figure 2:
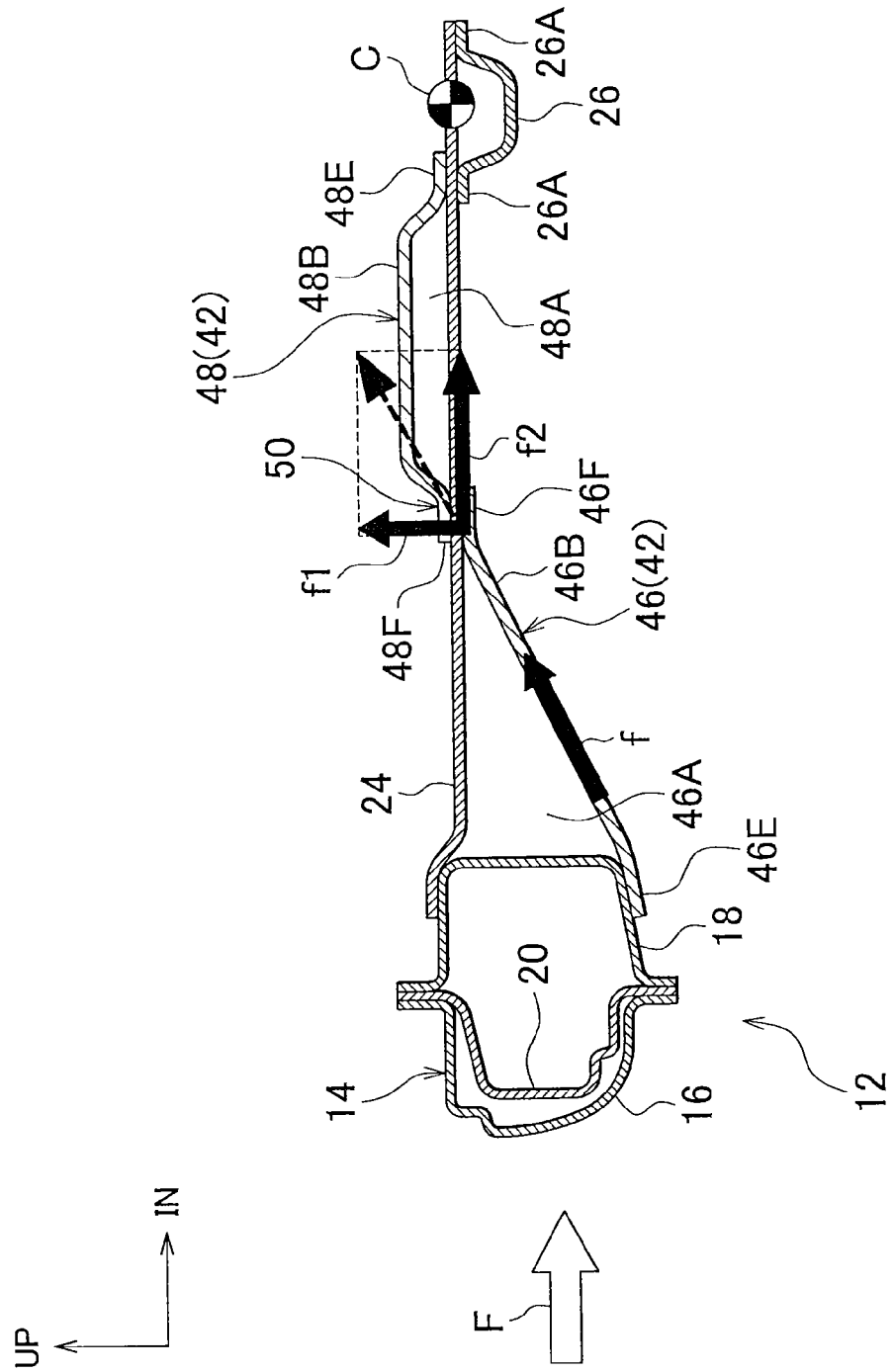
FIG. 2 is a vertical sectional view for explaining the input path of collision load in the floor structure of the automobile.
Figure 3:
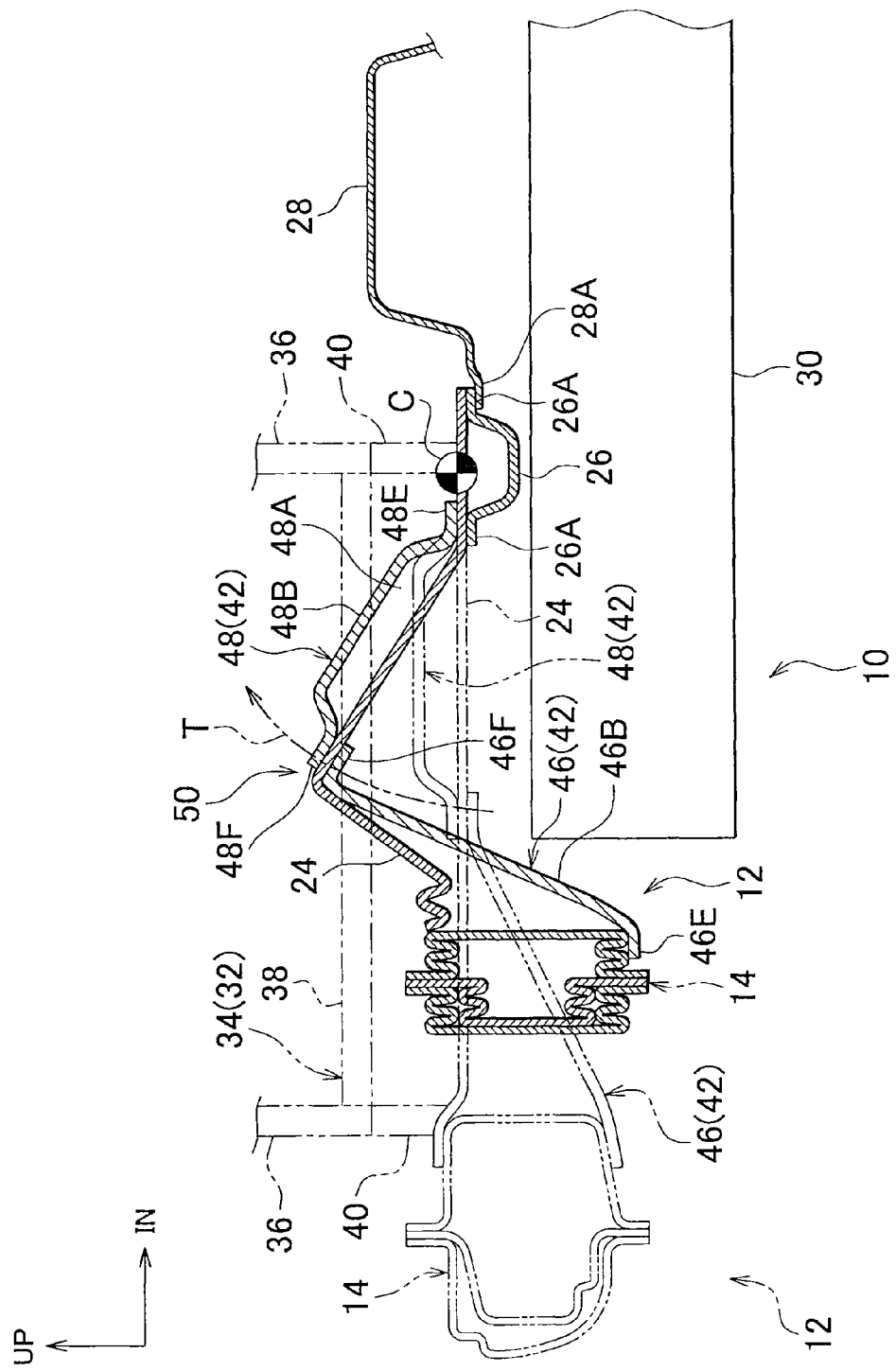
FIG. 3 is a vertical sectional view that illustrates a state in which the body's side portion has deformed inward in the body width direction in the floor structure of the automobile.

As illustrated in FIG. 2, in the battery protection structure 10 for an automobile configured as described above, when a collision load F directed inward in the body width direction is inputted to the rocker 14 as a result of a lateral collision, a part of the collision load F is transmitted to the inner end in the body width direction of the inside reinforcing member 48 via the lower wall 46B of the outside reinforcing member 46. The lower wall 46B slopes so as to elevate as the lower wall 46B extends inward in the body width direction. Therefore, as illustrated in FIG. 2, the load f transmitted to the inside reinforcing member 48 via the lower wall 46B includes a component f1 that is directed upward of the body, and a component f2 that is directed inward in the body width direction.

At this time, the component f2 directed inward in the body width direction is supported by the compressive strength of the inside reinforcing member 48. Thus, a rotation moment is exerted on the inside reinforcing member 48 by the component f1 directed upward of the body, with the under-reinforcement 26 side end of the inside reinforcing member 48 as a fulcrum C. Thus, as the inside reinforcing member 48 rotates toward the upper side of the body owing to the rotation moment, the cross member 42 flexes at the fragile portion 50 provided between the inside reinforcing member 48 and the outside reinforcing member 46 so that its midsection in the body width direction rises (elevates). Therefore, the area of the floor panel 24 facing the fragile portion 50 flexes toward the upper side of the body together with the cross member 42, causing the floor panel 24 to deform toward the upper side of the body with this flexing portion being situated at the top (the floor panel 24 deforms in a rotation mode along the rotation trajectory T illustrated in FIG. 3).

In other words, the cross member 42 inputs a part of the collision load F inputted to the rocker 14 and directed inward in the vehicle width direction, to the midsection of the floor panel 24 between the rocker 14 and the under-reinforcement 26 as the component f1 directed upward of the body. Also, the cross member 42 flexes at the fragile portion 50 that is provided in its midsection in the body width direction. Therefore, the cross member 42 deforms toward the upper side of the body integrally with the floor panel 24. As the floor panel 24 deforms toward the upper side of the body in this way, the impact energy of the lateral collision is dispersed, thereby reducing the amount of deformation (deformation stroke) of the body's side portion 12 toward the inner side in the body width direction. Therefore, the battery 30 that is placed more inward in the body width direction than the rocker 14 and below the floor panel 24 in the body can be protected from deformation of the body's side portion 12 in a favorable manner. As a result, it is possible to increase the battery capacity of the battery 30.

Figure 4:
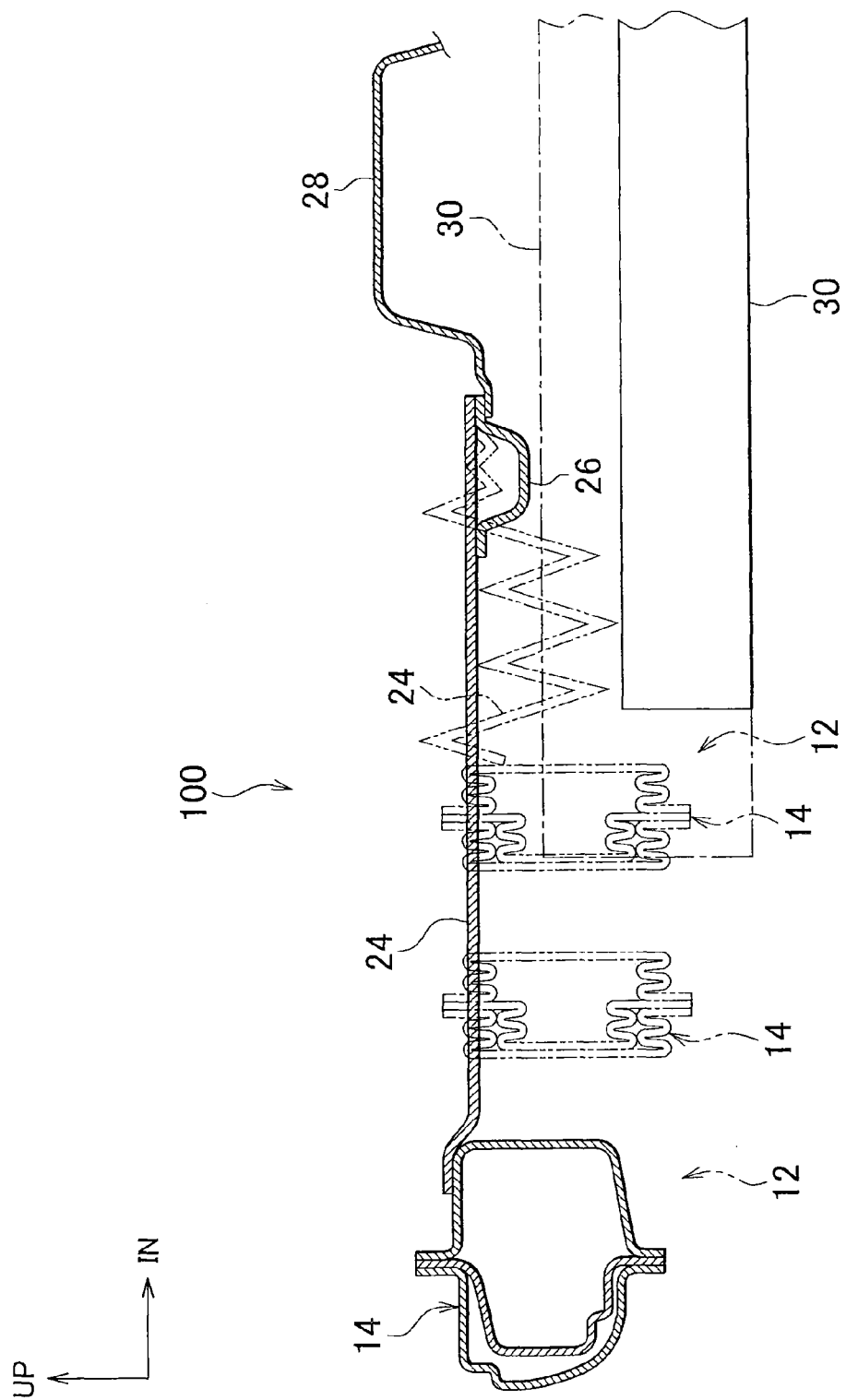
FIG. 4 is a vertical sectional view that illustrates a comparative example.

That is, in a case where the cross member 42 is omitted as in a comparative example 100 illustrated in FIG. 4, the collision load F exerted in a lateral collision causes large deformation (intrusion) of the body's side portion 12 toward the inner side in the body width direction. Thus, in order to protect the battery 30, it is necessary to take measures such as reducing the size of the battery 30 to an extent that can avoid interference between the body's side portion 12 and the battery 30. However, reducing the size of the battery 30 leads to a decrease in battery capacity and hence a decrease in the cruising distance of the automobile. As mentioned above, although it would be also conceivable to increase the strength and rigidity of the body's side portion 12, the mass and cost of the body increase in this case.

In contrast, according to this embodiment, the amount of deformation (deformation stroke) of the body's side portion 12 can be reduced as mentioned above. Therefore, it is possible to make the size of the battery 30 large, thereby securing sufficient battery capacity. The battery 30 according to this embodiment is indicated by alternate long and short dashed lines in FIG. 4. Moreover, the cross member 42 may simply be any cross member that guides deformation of the floor panel 24 toward the upper side of the body. Thus, the cross member 42 can be constructed with light weight and at low cost. Therefore, it is possible to keep the mass and cost of the body from increasing.

Furthermore, according to this embodiment, the cross member 42 is placed at a position that overlaps the rear frame 38, which is a component of the seat cushion frame 34 in the vehicle seat 32, in plan view. Thus, when the floor panel 24 is deformed toward the upper side of the body by the cross member 42, the floor panel 24 can be brought into interference with the rear frame 38 (the seat cushion frame 34). Therefore, a load that inhibits rotation of the inside reinforcing member 48 is exerted, thereby increasing the amount of impact energy absorption. Consequently, the deformation stroke of the body's side portion toward the inner side in the body width direction can be effectively reduced. Moreover, according to this embodiment, the length dimension "b" of the lower wall 46B of the outside reinforcing member 46 is set longer than the distance "a" between the rear frame 38 and the floor panel 24 (b>a). Therefore, the floor panel 24 can be brought into interference with the seat cushion frame 34 in a favorable manner.

Also, according to this embodiment, the cross member 42 is divided into the outside reinforcing member 46 and the inside reinforcing member 48. Therefore, the strength, rigidity, and the like of the two reinforcing members can be set individually. Consequently, the deformation mode of the cross member 42 can be easily set.

Furthermore, according to this embodiment, the outside reinforcing member 46 defines a closed section together with the rocker 14 and the floor panel 24, and the inside reinforcing member 48 defines a closed section together with the floor panel 24. Therefore, it is possible to make the cross member 42 lightweight while securing the strength and rigidity required of the outside reinforcing member 46 and the inside reinforcing member 48.

<Supplementary explanation of the embodiment> In the above-mentioned embodiment, the outside reinforcing member 46 defines a closed section together with the rocker 14 and the floor panel 24, and the inside reinforcing member 48 defines a closed section together with the floor panel 24. However, the invention is not limited to this. The shapes of the outside reinforcing member and inside reinforcing member may be changed as appropriate.

Also, in the above-mentioned embodiment, the inside reinforcing member 48 is placed on the upper surface side of the floor panel 24. However, the invention is not limited to this. The inside reinforcing member may be placed on the lower surface side of the floor panel.

Also, in the above-mentioned embodiment, the cross member 42 as an input member is divided into the outside reinforcing member 46 and the inside reinforcing member 48. However, the invention is not limited to this. The outside reinforcing member and the inside reinforcing member may be formed integrally.

Also, in the above-mentioned embodiment, the cross member 42 as an input member is placed at a position that overlaps the rear frame 38 (frame) of the vehicle seat 32 (front seat) in plan view. However, the invention is not limited to this. The placement of the input member may be changed as appropriate.

Further, in the above-mentioned embodiment, the cross member 42 (input member) flexes at the fragile portion 50 so that its midsection in the body width direction rises toward the upper side of the body by the collision load F that is inputted to the rocker 14 and directed inward in the body width direction. However, the invention is not limited to this. The input member may be configured in any way as long as the input member inputs, upon input of a collision load directed inward in the body width direction to the rocker, a part of the collision load to the midsection of the floor panel between the rocker and the under-reinforcement as a component directed upward of the body.

What is claimed is:

1. A battery protection structure for an automobile, comprising:
    a rocker that is placed in a side portion of a body of the automobile;
    a floor panel whose outer end in a body width direction is secured to the rocker;
    a reinforcement that is located more inward in the body width direction than the rocker, and is secured to the floor panel, the reinforcement forming a part of a frame of the body;
    a battery that is located more inward in the body width direction than the rocker, and is placed below the floor panel and the reinforcement in the body;
    a fragile portion located above the battery between the rocker and the reinforcement, and including at least one portion that is more inward in the body width direction than an end of the battery; and
    an input member that connects between the rocker and the reinforcement, and is configured to input, upon input of a collision load directed inward in the body width direction to the rocker, a part of the collision load to a midsection of the floor panel between the rocker and the reinforcement as a component directed upward of the body such that a portion of the floor panel above the end of the battery deforms in a rotation mode along a rotation trajectory away from the battery.

2. The battery protection structure according to claim 1, wherein the input member is placed at a position that overlaps a frame of a vehicle seat mounted on an upper surface side of the floor panel in plan view.

3. The battery protection structure according to claim 1, wherein the input member includes:
    an outside reinforcing member that has a slope portion, the slope portion connecting between the rocker and the floor panel in a sloping manner so as to elevate as the slope portion extends inward in the body width direction, and
    an inside reinforcing member that is placed more inward in the body width direction than the outside reinforcing member, and connects between an inner end in the body width direction of the slope portion and the reinforcement, and
    wherein the fragile portion is provided between the outside reinforcing member and the inside reinforcing member.

4. The battery protection structure according to claim 3, wherein the outside reinforcing member defines a closed section together with the rocker and the floor panel, and
    wherein the inside reinforcing member defines a closed section together with the floor panel.

5. The battery protection structure according to claim 3, wherein the fragile portion includes a flange of the inside reinforcing member, a flange of the outside reinforcing member, and a portion of the floor panel to which the flange of the inside reinforcing member and the flange of the outside reinforcing member are both attached.

6. A battery protection structure for an automobile, comprising:
    a rocker that is placed in a side portion of a body of the automobile;
    a floor panel whose outer end in a body width direction is secured to the rocker;
    a reinforcement that is located more inward in the body width direction than the rocker, and is secured to the floor panel, the reinforcement forming a part of a frame of the body;
    a battery that is located more inward in the body width direction than the rocker, and is placed below the floor panel and the reinforcement in the body;
    a fragile portion located above the battery between the rocker and the reinforcement, and including at least one portion that is more inward in the body width direction than an end of the battery; and
    an input member that connects between the rocker and the reinforcement, and is joined to the floor panel,
    wherein a midsection of the input member is flexed in the body width direction so as to rise toward an upper side of the body by a collision load inputted to the rocker and directed inward in the body width direction such that a portion of the input member above the end of the battery rotates toward the upper side of the body away from the battery.

7. The battery protection structure according to claim 6, wherein the input member is placed at a position that overlaps a frame of a vehicle seat mounted on an upper surface side of the floor panel in plan view.

8. The battery protection structure according to claim 6, wherein the input member includes:
    an outside reinforcing member that has a slope portion, the slope portion connecting between the rocker and the floor panel in a sloping manner so as to elevate as the slope portion extends inward in the body width direction, and
    an inside reinforcing member that is placed more inward in the body width direction than the outside reinforcing member, and connects between and an inner end in the body width direction of the slope portion and the reinforcement, and
    wherein the fragile portion is provided between the outside reinforcing member and the inside reinforcing member.

9. The battery protection structure according to claim 8, wherein the outside reinforcing member defines a closed section together with the rocker and the floor panel, and
    wherein the inside reinforcing member defines a closed section together with the floor panel.

10. The battery protection structure according to claim 8, wherein the fragile portion includes a flange of the inside reinforcing member, a flange of the outside reinforcing member, and a portion of the floor panel to which the flange of the inside reinforcing member and the flange of the outside reinforcing member are both attached.

11. The battery protection structure according to claim 3, wherein a frame of a vehicle seat is mounted on an upper surface of the floor panel and includes a rear frame located a distance above the upper surface of the floor panel,
    wherein the rear frame substantially overlaps the slope portion of the outside reinforcing member in plan view, and
    wherein the slope portion of the outside reinforcing member includes a length that is greater than the distance of the rear frame above the upper surface of the floor panel.

12. The battery protection structure according to claim 8, wherein a frame of a vehicle seat is mounted on an upper surface of the floor panel and includes a rear frame located a distance above the upper surface of the floor panel,
    wherein the rear frame substantially overlaps the slope portion of the outside reinforcing member in plan view, and wherein the slope portion of the outside reinforcing member includes a length that is greater than the distance of the rear frame above the upper surface of the floor panel.

13. The battery protection structure according to claim 1, wherein upon input of the collision load directed inward in the body width direction,
    a reinforcement side end of the input member provides a fulcrum located more inward in the body width direction than the fragile portion,
    a rotation moment is exerted on a portion of input member between the fulcrum and the fragile portion, and
    the input member flexes at the fragile portion toward an upper side of the body with the midsection of the floor panel.

14. The battery protection structure according to claim 6, wherein the collision load is inputted to the rocker and directed inward in the body width direction and
    a reinforcement side end of the input member provides a fulcrum located more inward in the body width direction than the fragile portion,
    a rotation moment is exerted on a portion of input member between the fulcrum and the fragile portion,
    the input member flexes at the fragile portion toward the upper side of the body with a midsection of the floor panel,
    and a portion of the floor panel above the battery deforms in a rotation mode along a rotation trajectory away from the battery.

15. The battery protection structure according to claim 1, wherein the input member includes:
    an inside reinforcing member on an upper side of the floor panel located inward in the body width direction of the fragile portion, and
    an outside reinforcing member on a bottom side of the floor panel located outward in the body width direction of the fragile portion.

16. The battery protection structure according to claim 15, wherein the fragile portion is a coupling portion among a first flange of the inside reinforcing member, a second flange of the outside reinforcing member, and a portion of the floor panel between the first flange and the second flange.

17. The battery protection structure according to claim 6, wherein the input member includes:
    an inside reinforcing member on an upper side of the floor panel located inward in the body width direction of the fragile portion, and
    an outside reinforcing member on a bottom side of the floor panel located outward in the body width direction of the fragile portion.

18. The battery protection structure according to claim 17, wherein the fragile portion is a coupling portion among a first flange of the inside reinforcing member, a second flange of the outside reinforcing member, and a portion of the floor panel between the first flange and the second flange.

* * * * *